(12) United States Patent
Locken et al.

(10) Patent No.: US 11,016,049 B2
(45) Date of Patent: May 25, 2021

(54) AGRICULTURAL MOISTURE AND TEST WEIGHT SENSOR WITH CO-PLANAR ELECTRODES

(71) Applicant: Deere & Company, Moline, IL (US)

(72) Inventors: Andrew C. Locken, Lakewood, CO (US); Brian J. Booth, West Fargo, ND (US); William D. Todd, Bettendorf, IA (US)

(73) Assignee: Deere & Company, Moline, IL (US)

( * ) Notice: Subject to any disclaimer, the term of this patent is extended or adjusted under 35 U.S.C. 154(b) by 149 days.

(21) Appl. No.: 16/386,656

(22) Filed: Apr. 17, 2019

(65) Prior Publication Data

US 2020/0333278 A1  Oct. 22, 2020

(51) Int. Cl.
*G01N 27/22* (2006.01)
*A01D 41/127* (2006.01)

(52) U.S. Cl.
CPC ....... *G01N 27/223* (2013.01); *A01D 41/1272* (2013.01); *G01N 27/221* (2013.01); *G01N 27/226* (2013.01)

(58) Field of Classification Search
CPC . G01N 27/226; G01N 27/221; A01D 41/1272
See application file for complete search history.

(56) References Cited

U.S. PATENT DOCUMENTS

| | | | | |
|---|---|---|---|---|
| 6,282,476 B1* | 8/2001 | Hieronymus | ........ | A01D 41/127 340/684 |
| 6,686,749 B2 | 2/2004 | Rains et al. | | |
| 8,340,862 B2* | 12/2012 | Baumgarten | ........ | A01D 41/127 701/33.4 |
| 9,140,824 B1 | 9/2015 | Mewes et al. | | |
| 9,494,538 B2* | 11/2016 | Kozicki | ............... | G01N 27/223 |
| 2014/0355660 A1* | 12/2014 | Kameya | ........... | H04L 25/03114 375/232 |
| 2015/0366149 A1 | 12/2015 | Canyon et al. | | |
| 2016/0187185 A1* | 6/2016 | Smith | ................. | A01F 15/0825 177/1 |
| 2016/0330906 A1* | 11/2016 | Acheson | .............. | A01D 41/127 |
| 2016/0379317 A1* | 12/2016 | Honda | ................. | G06Q 10/087 705/28 |
| 2017/0039657 A1* | 2/2017 | Honda | ................... | G06Q 10/06 |

FOREIGN PATENT DOCUMENTS

EP   2927675 A1   7/2015

OTHER PUBLICATIONS

K.C. Lawrence. Wheat Moisture Determination by 1-to 110 MHz Swept-Frequency Admittance Measurements, 1998 American Society of Agricultural Engineers vol. 41(1):135-142, 8 pages.

* cited by examiner

*Primary Examiner* — Alvaro E Fortich
(74) *Attorney, Agent, or Firm* — Joseph R. Kelly; Kelly, Holt & Christenson PLLC

(57) ABSTRACT

An agricultural permittivity sensor has a drive electrode and a separate sense electrode. Both electrodes have surfaces that face the sensed material and the surfaces are co-planar. The drive electrode receives an excitation signal and generates an electric field that produces a current in the sense electrode. The current is indicative of a test weight of the sensed material.

20 Claims, 10 Drawing Sheets

US 11,016,049 B2

1

AGRICULTURAL MOISTURE AND TEST WEIGHT SENSOR WITH CO-PLANAR ELECTRODES

REFERENCE TO RELATED ART

The present disclosure makes reference to U.S. Pat. No. 9,494,538.

FILED OF THE DISCLOSURE

The present disclosure relates to agricultural sensors. More specifically, the present disclosure relates to sensors on an agricultural machine for sensing test weight of an agricultural product.

BACKGROUND

Moisture sensors are used in agricultural harvesting equipment in order to obtain a measure of the moisture of the harvested product. Some current moisture sensors sense moisture by measuring the dielectric permittivity of the harvested product at one or more frequencies and then applying a calibration function in order to estimate the moisture, from the measured permittivity. Some such moisture sensors use a capacitive structure in which the harvested material forms the dielectric medium in the capacitive structure.

There are a variety of different types of moisture sensors, which have different geometries. One geometry involves the capacitive structure being formed as a parallel plate structure in which the material being measured passes between the plates of the capacitive structure, and forms the dielectric medium. One of the two plates is driven with an excitation voltage and the other plate senses current induced by an electric field passing through the capacitive structure. This type of structure works well for many materials, such as grains.

Some moisture sensors are also planar structures. The planar structures have a drive electrode to which an excitation voltage is applied, and the current passing through the drive electrode is also measured. The drive electrode sets up a fringing electric field that passes from it, out through the material being measured, and back to various grounded conductive surfaces in the same plane. The drive voltage and resulting current are measured and used to compute the permittivity of the measured material. These types of sensors can work better with soft, compressible material (such as hay, cotton and forage) that do not flow easily through a parallel plate structure.

Recent developments have been made with respect to sensor structures. U.S. Pat. No. 9,494,538 discusses this.

The discussion above is merely provided for general background information and is not intended to be used as an aid in determining the scope of the claimed subject matter.

SUMMARY

An agricultural permittivity sensor has a drive electrode and a separate sense electrode. Both electrodes have surfaces that face the sensed material and the surfaces are co-planar. The drive electrode receives an excitation signal and generates an electric field that produces a current in the sense electrode. The current is indicative of a test weight of the sensed material.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As mentioned in the background section, some moisture sensors have a planar structure. In such a structure, the electrodes are coplanar and the sensed material is placed into contact with the sensed material. The drive electrode receives an excitation signal and sets up a fringing electric field that passes through the sensed material. The fringing electric field passes back to the various grounded conductive surfaces in the plane of the electrode. The complex drive voltage and resulting complex current are measured and used to compute the permittivity of the material being tested.

Thus, in such planar structures, the current through the drive electrode is measured. A significant portion of this current, however, results from electric field flux lines that link to ground through media other than the material being measured. For instance, some of the electric field flux lines can link to ground through the air, through insulator components on the structure, and through other items.

This current is known as parasitic current and is caused by parasitic capacitive and conductive effects. The parasitic current can account for a large portion of the measured current (perhaps as much as 75% of the measured current), which results in a poor signal-to-noise ratio on the measured current.

In addition, the parasitic current is influenced by properties, especially temperature and humidity, of various materials, other than the material that is being measured. Some moisture sensors attempt to correct for the parasitic current in the calibration process. However, it can be very difficult to maintain an appropriate correction as the temperature and other conditions vary. This results in significant drift in the permittivity measurements.

The present description relates to a sensor structure that can be used to sense a crop characteristic. Some example structures were disclosed in U.S. Pat. No. 9,494,538 for use in sensing moisture. Those and other structures disclosed herein, and other processing disclosed herein, can be used to measure test weight and other crop characteristics of interest.

Figure 1:
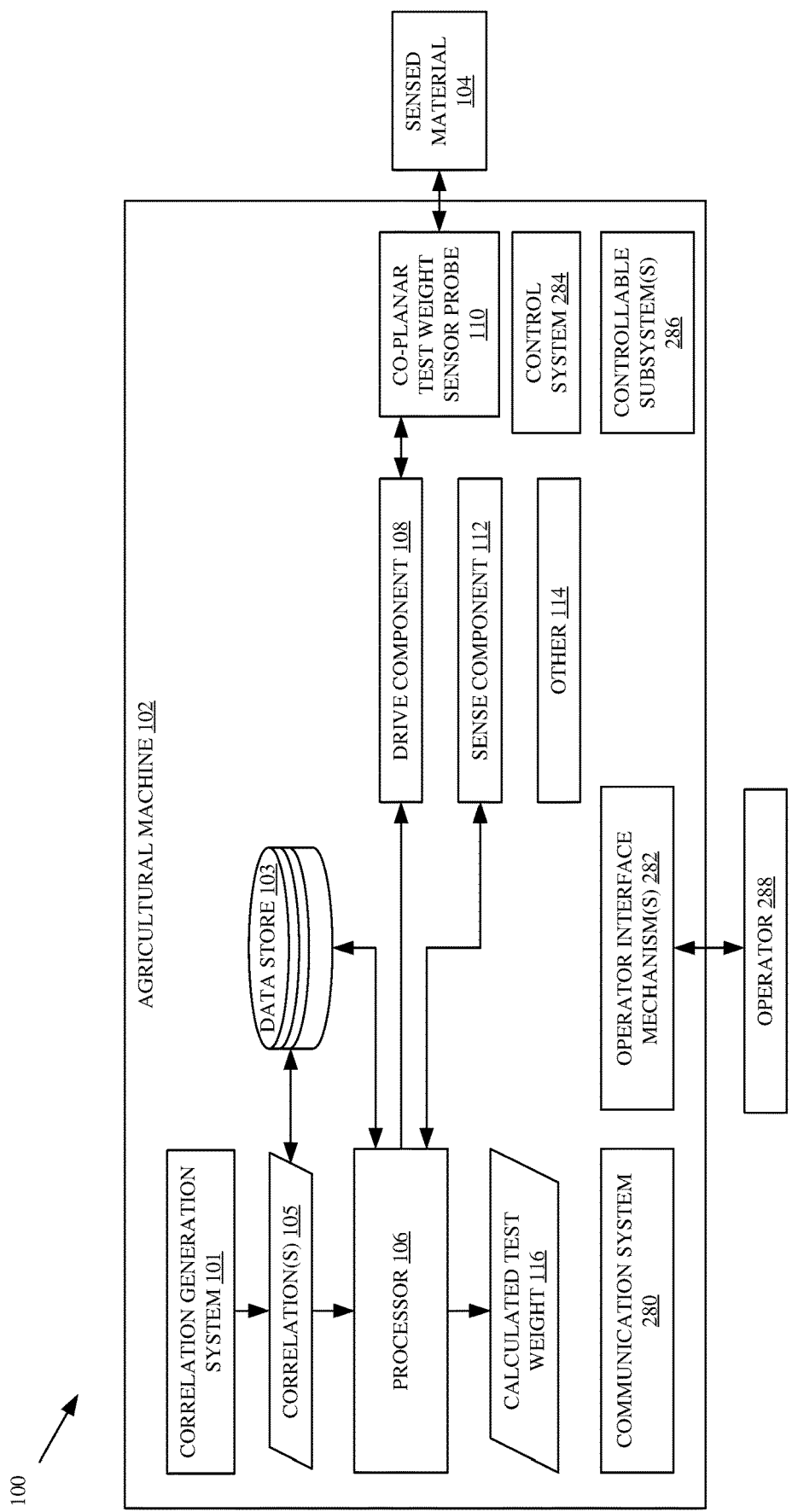
FIG. 1 is a block diagram of one example of a test weight measuring system on an agricultural machine.

FIG. 1 shows one example of a block diagram of a test weight sensing system 100 on an agricultural machine 102. System 100 can be used to sense a wide variety of other crop characteristics, other than test weight, that can be derived from dielectric permittivity, but test weight is described herein for the sake of example. Test weight can be a measure of harvested crop weight per unit volume (such as weight per bushel). Agricultural machine 102 can be a wide variety of different types of machines, such as a combine harvester (or combine), a baler, a cotton harvester or a wide variety of other agricultural machines. Agricultural machine 102 illustratively comes into contact with sensed material 104 and has a conveying mechanism that conveys the material 104 through machine 102. As an example, the sensed material 104 can be material that is being harvested by agricultural machine 102. In an example in which agricultural machine 102 is a combine harvester, the sensed material 104 can be grain. When agricultural machine 102 is a baler, the sensed material 104 can be hay, cotton, or other baled material. These are examples only.

Test weight sensing system 100 illustratively includes correlation generation system 101, data store 103 (which can store correlations 105), processor 106, test weight identifier logic 107, drive component 108, co-planar permittivity sensor probe 110, sense component 112, communication system 180, operator interface mechanisms 182, control system 184 and controllable subsystems 186 and it can include other components 114 as well. Correlation generation system 101 is illustratively used to identify correlations between permittivity and the crop characteristic of interest (such as test weight, moisture, density, etc.) Correlation generation system 101 can thus be external to agricultural machine 102, or it can be on agricultural machine 102. It illustratively takes measurements of dielectric permittivity of material being sensed, and then correlates those measurements to the measured characteristic of interest (such as the measured test weight, density, etc.) of the material being sensed, which is measured separately. Based on the sensed dielectric permittivity, and the measured characteristic of interest, system 101 generates correlations between the two. The correlations can be equations that receive a dielectric permittivity of a particular material and generate a value for test weight (or other characteristic of interest). The correlations can be embodied in a dynamic model, in a look up table, etc. The correlations 105 can be stored in data store 103, where they are accessed by processor 106, during run time. They can be stored and used in other ways as well.

Processor 106 is illustratively a computer processor with associated memory and timing circuitry, not separately shown. It can run, or facilitate, test weight identifier logic 107. It controls drive component 108 to drive an electrode in co-planar permittivity sensor probe 110. Sense component 112 illustratively senses a parameter (such as current) in one of the electrodes in co-planar permittivity sensor probe 110 and provides that signal to processor 106. Processor 106 uses logic 107 to access correlations 105 and calculate a test weight (or other characteristic) value indicative of the test weight (or characteristic) of sensed material 104. The calculated test weight is indicated by block 116 in FIG. 1.

Calculated test weight 116 can be used in a wide variety of different ways. For instance, it can be combined with a position signal in order to generate a test weight map. It can also be used in yield monitoring applications and to provide information to assist in making decisions about harvesting, storage, and future processing. It can be used in near real time control to control a controllable subsystem of machine 102 (such as a speed or direction of machine 102, settings on machine 102, etc.). It can be used in a wide variety of other ways as well.

Communication system 180 can be used to facilitate communication among items on agricultural machine 102 and with remote systems. Therefore, it can be a local area network communication system, a wide area network communication system, a cellular network communication system, a near field communication system, a controller area network communication system, or any of a wide variety of other systems or combinations of systems.

Operator interface mechanisms 182 allow an operator 188 to control and manipulate agricultural machine 102. Therefore, mechanisms 182 can include such things as a steering wheel, pedals, levers, buttons, touch sensitive input displays, microphone and speakers (where speech recognition functionality is provided), icons, links, and other user actuatable items that can be displayed and actuated by a point and click device or touch gestures, among a wide variety of other audio, visual and/or haptic mechanisms.

Control system 184 can receive inputs from various sensors and logic and inputs from operator 188 and control controllable subsystems 186 based on those inputs. The controllable subsystems can include such things as a propulsion system which drives movement of agricultural machine 102, a steering subsystem, various setting subsystems which can be used to adjust settings of machine 102, or a wide variety of other controllable subsystems.

Figure 2:
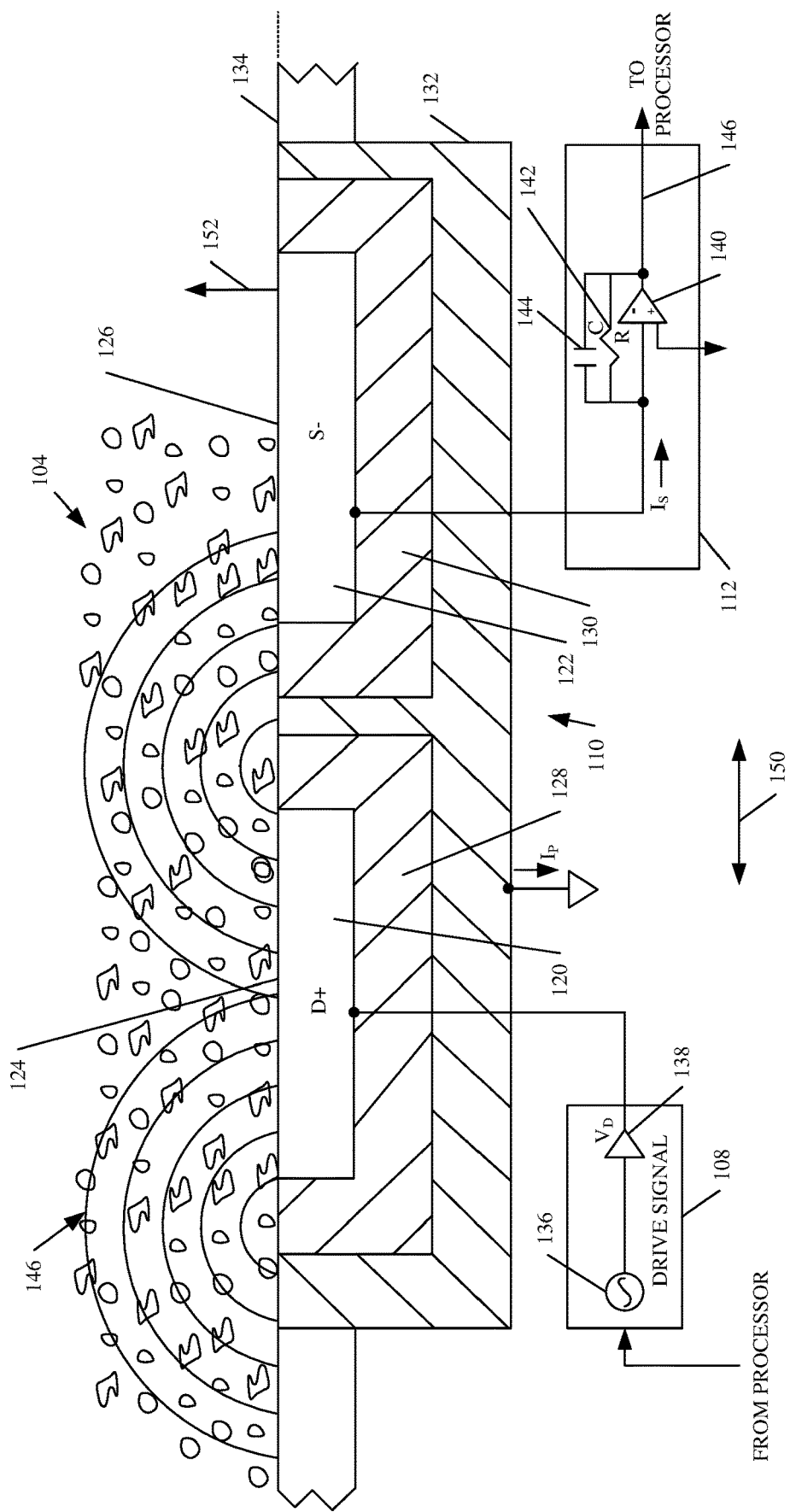
FIG. 2 is a partial schematic, partial sectional view of a portion of the test weight measuring system shown in FIG. 1.

FIG. 2 is a partial schematic, partial cross-sectional view of one example of co-planar permittivity sensor probe 110, drive component 108 and sense component 112. In the example shown in FIG. 2, probe 110 includes a drive electrode 120 and a sense electrode 122. It will be appreciated that a plurality of different electrodes can be used and two are shown in the example in FIG. 2 for the sake of example only.

Drive electrode 120 has a material facing surface 124 that is substantially co-planar with a material facing surface 126 of sense electrode 122. They are illustratively co-planar so that the material being measured 128 can come into contact with electrodes 120 and 122 on their co-planar surfaces, or at least come into close proximity to the surfaces. Each of the electrodes 120 and 122 illustratively has an insulator 128 and 130, respectively, disposed thereabout. Thus, electrodes 120 and 122 have insulators 128 and 130, respectively, encompassing all of their surfaces, except for the material facing surfaces 124 and 126.

Probe 110 also illustratively includes a ground electrode 132. Ground electrode 132 surrounds at least sense electrode 122 (and its insulator 130). It can surround both electrodes 120 and 122 and both insulators 128 and 130. However, it leaves exposed the material facing surfaces 124 and 126 of electrodes 120 and 122.

In the example shown in FIG. 2, probe 110 is coupled to structural machine housing 134. This can be a housing of a combine, a baler, or another agricultural machine 102. For instance, where agricultural machine 102 is a combine, probe 110 can be mounted to housing 134 on the grain bypass of a clean grain elevator on the combine. In addition, it can be mounted on the bottom boot area of the clean grain elevator. Further, where the sensor is sensing test weight of other biomass material (such as material other than grain), it can be mounted to the rear of the rotor on a combine or on the residue hood adjacent the discharge beater of a combine. In addition, where agricultural machine 102 is a baler or cotton harvester, it can be mounted on an interior side wall of the bale chamber or harvester, or in other locations. These are given by way of example only, and the machine housing 134 can be another structural portion of an agricultural machine as well.

Drive component 108 illustratively includes a controllable oscillator 136. Oscillator 136 can be controlled by processor 106 to provide an alternating current (AC) drive signal to an operational amplifier 138 which, itself, provides an alternating current (AC) drive voltage VD at its output. Voltage VD is applied to drive electrode 120 as an excitation signal.

Sense component 112 illustratively includes a zero input impedance current sense amplifier 140 connected to an RC circuit formed by resistor 142 and capacitor 144. Sense component 112 is coupled to sense electrode 122 to receive sense current IS at its input. It provides, at its output, a signal 146 indicative of sense current IS.

When the drive voltage VD is applied to drive electrode 120, electrode 120 illustratively produces a fringing electric field represented by electric field flux lines 146. The drive voltage VD can be provided at one or more different frequencies in order to set up the electric field represented by flux lines 146. The electric field is set up by electrode 120, through the sensed material 104. The electric field links with all surrounding grounded surfaces in the plane of the material facing surfaces 124 and 126 of electrodes 120 and 122.

Sense electrode 126 is illustratively held at ground potential. The current induced in sense electrode 122 by the electric field passing through sense electrode 122 is referred to above as the sense current IS.

Guard electrode 132 is also held at ground potential and inhibits any portion of the electric field that passes through the insulators 128 and 130, or paths other than through material 104, from reaching sense electrode 122. Instead, the parasitic current IP that is produced by flux lines through the insulator material or through other paths, other than the sensed material 104, is shorted to ground through guard electrode 132. It does not reach sense electrode 122. Thus, guard electrode 132 inhibits or blocks flux paths that do not pass solely through sensed material 104. They therefore do not contribute to the sensed current IS.

Rather, the sensed current IS, which is sensed in the sense electrode 122 (instead of the drive electrode 120) is induced only by the flux paths passing through the material being measured 104 and reaching sense electrode 122. The sense current IS is thus not influenced by parasitic flux paths through the insulators or directly to ground. All of that flux links with the grounded guard 132, so it does not affect sense current IS.

Probe 110 is thus configured to measure only the permittivity of the sensed material 104 and is insensitive to characteristics of the probe structure (including, but not limited to, characteristics of the insulators 128 and 130 surrounding electrodes 120 and 122). By sensing current in the sense electrode 122, rather than the drive electrode 120, parasitic capacitive and conductive coupling between the drive electrode 120 and ground is substantially eliminated from the sensed current IS. By maintaining both guard electrode 132 and the sense electrode 122 at ground potential, sensitivity to parasitic capacitance and conductance between the sense electrode 122 and the surrounding grounded structure is substantially eliminated as well.

It should be noted that other configurations for sensor probe 110 can be provided. For instance, if the drive electrode 120 and sense electrode 122 are moved further apart (such as in the direction indicated by arrow 150) or if they are moved closer together, this can affect the signal level of the sense current IS. This is because the spacing between the two electrodes 120 and 122 will affect the depth of penetration of flux lines 146 into the sensed material 104. Moving them further apart will allow the flux lines 146 to penetrate more deeply into the sensed material 104 in the direction indicated by arrow 152. Moving them closer together will result in the flux lines 146 penetrating less deeply.

Figure 2A:
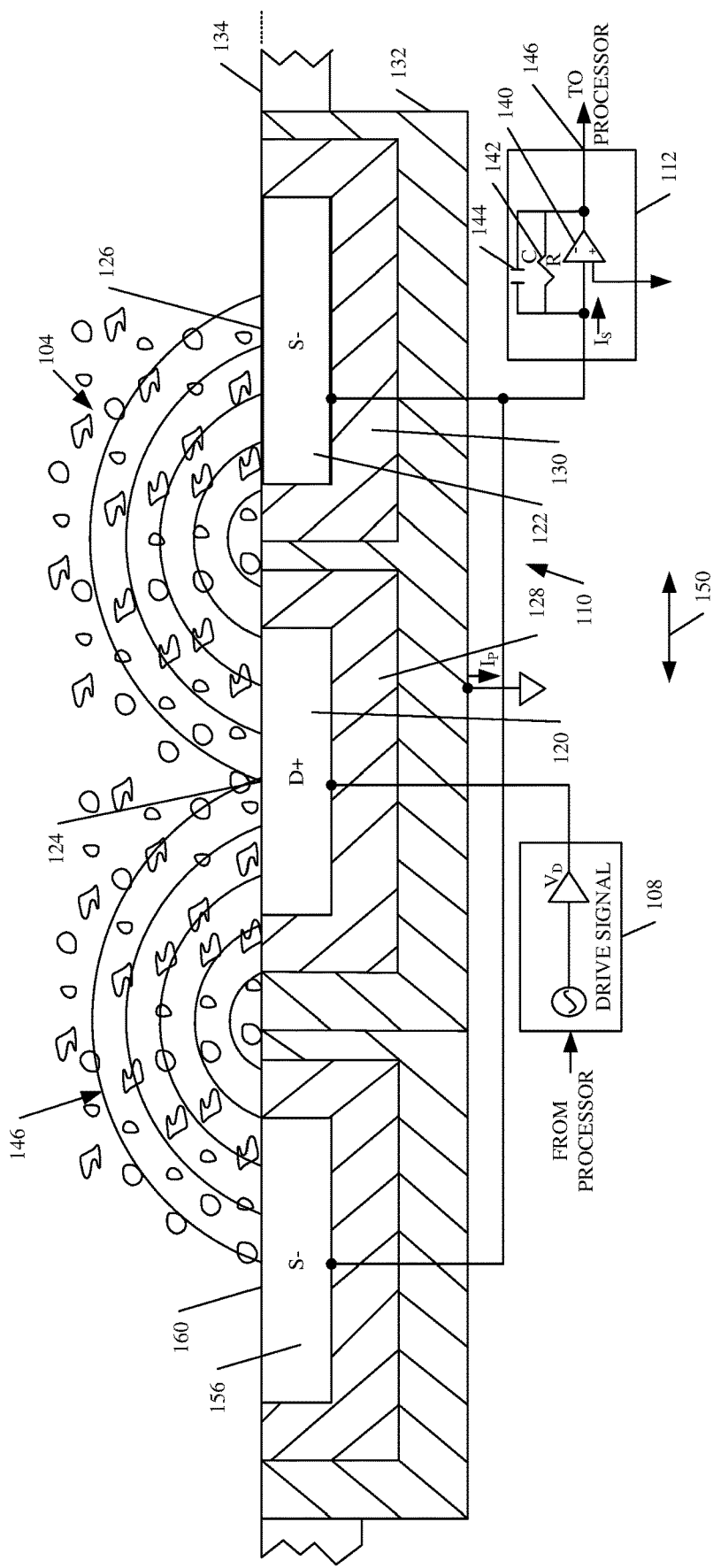
FIG. 2A is a partial schematic, partial sectional view of a portion of another example of the test weight measuring system shown in FIG. 1.

FIG. 2A shows another example configuration of coplanar permittivity sensor probe 110. The example shown in FIG. 2A is similar to that shown in FIG. 2, in some ways, and similar items are similarly numbered. It can be see, however, that in the example shown in FIG. 2A, probe 110 not only includes drive electrode 120 and sense electrode 122, but it also includes a second sense electrode 156.

Sense electrode 156 also has an insulator 158 disposed thereabout. Like insulators 128 and 130, it is disposed about all surfaces of electrode 156 except the material facing surface 160 which is, itself, co-planar with the material facing surfaces 124 and 126 of electrodes 120 and 122. In addition, it can be seen that grounded guard electrode 132 also extends about all of the surfaces of sense electrode 156 (and insulator 158), except surface 160.

Thus, while the operation is similar to that shown in the example of FIG. 2, the example of FIG. 2A includes the additional sense electrode 156. Guard electrode 132 prevents flux lines 146 (other than those through the sensed material) from reaching sense electrode 156. Therefore, current induced by the flux lines 146 that reach sense electrodes 122 and 156 will be represented in sense current IS.

It will be noted that other configurations can be used as well. For instance, multiple drive electrodes can be used with a single sense electrode, or there can be multiple drive electrodes and multiple sense electrodes. All of these various configurations are contemplated herein.

Figure 3:
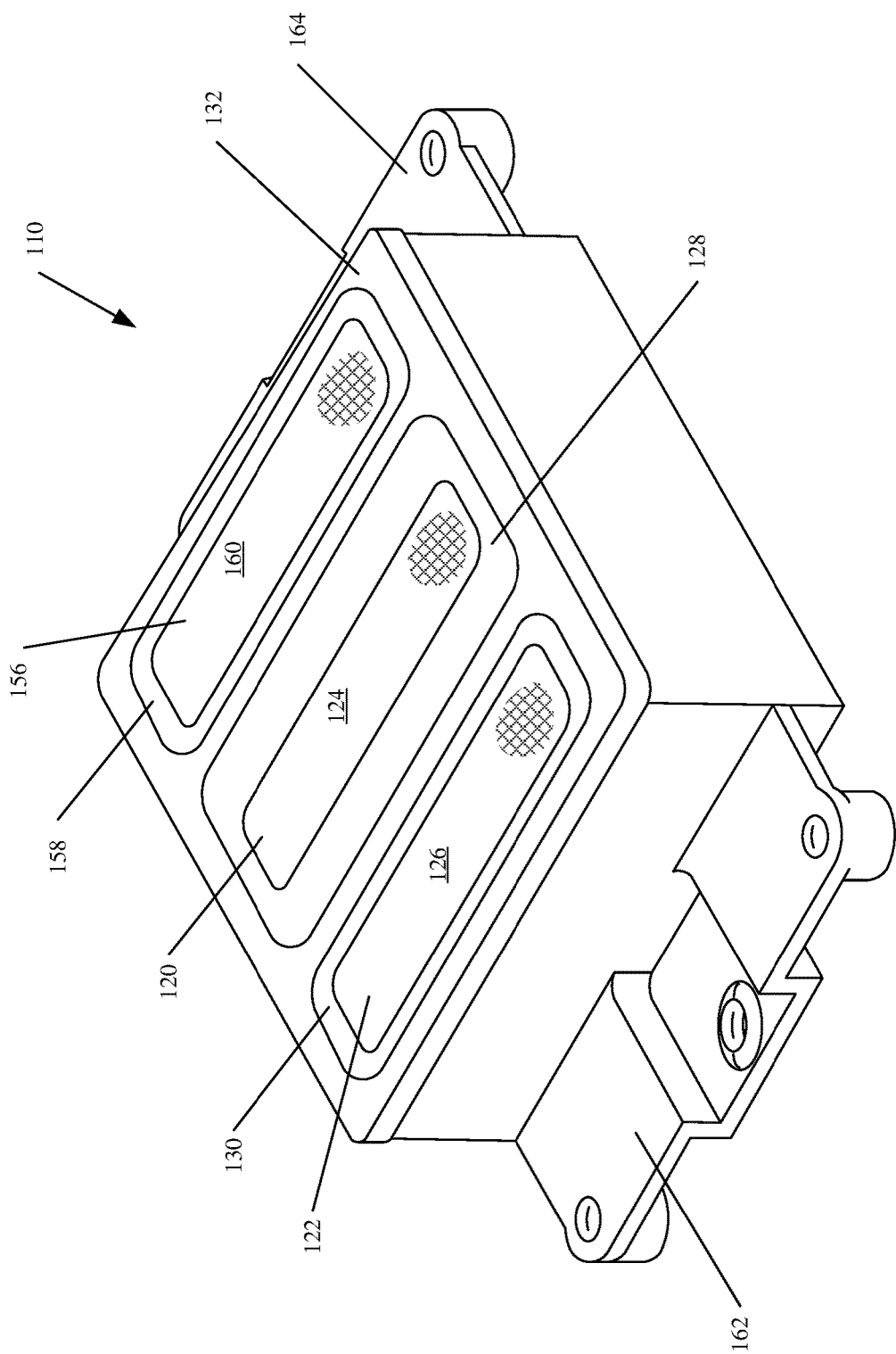
FIG. 3 is a perspective view of one example of a test weight sensor probe.

FIG. 3 is a perspective, pictorial view of one example of the sensor probe 110 shown in FIG. 2A. Similar items to those shown in FIG. 2A are similarly numbered in FIG. 3. In the example shown in FIG. 3, probe 110 has a set of mounting structures 162 and 164 that can be used to mount probe 110 to machine housing 134. In one example, the surfaces 124, 126 and 160 of electrodes 120, 122 and 156, respectively, are mounted flush with the machine housing 134. In another embodiment, however, they can protrude from the machine housing 134 in the direction of the material being measured 104 or they can be set back in the opposite direction. All of these examples are contemplated herein.

In addition, in one example, grounded guard electrode 132 has through holes. The through holes receive electrical connection elements that connect a circuit board that includes drive component 108 and sense component 112 to the corresponding electrodes 120, 122 and 156. Of course, the particular configuration of the connections in sensor probe 110 can vary with the application. For instance, where probe 110 is mounted within a grain elevator, a clean grain tank, in the bale chamber of a baler, or on the spout of a combine or other harvester, the connections used to connect probe 110 to the machine housing 134 may vary. Also, the configuration may change, based upon the particular nature of the harvested material. When the harvested material is hay, cotton, or another relatively soft material, it may take one configuration (such as being flush with the machine housing 134). When it is a grain or other granular material, it may take another configuration, such as protruding slightly from the machine housing 134. Of course, these are given by way of example only, and the mounting configuration can vary in other ways as well.

Figure 4:
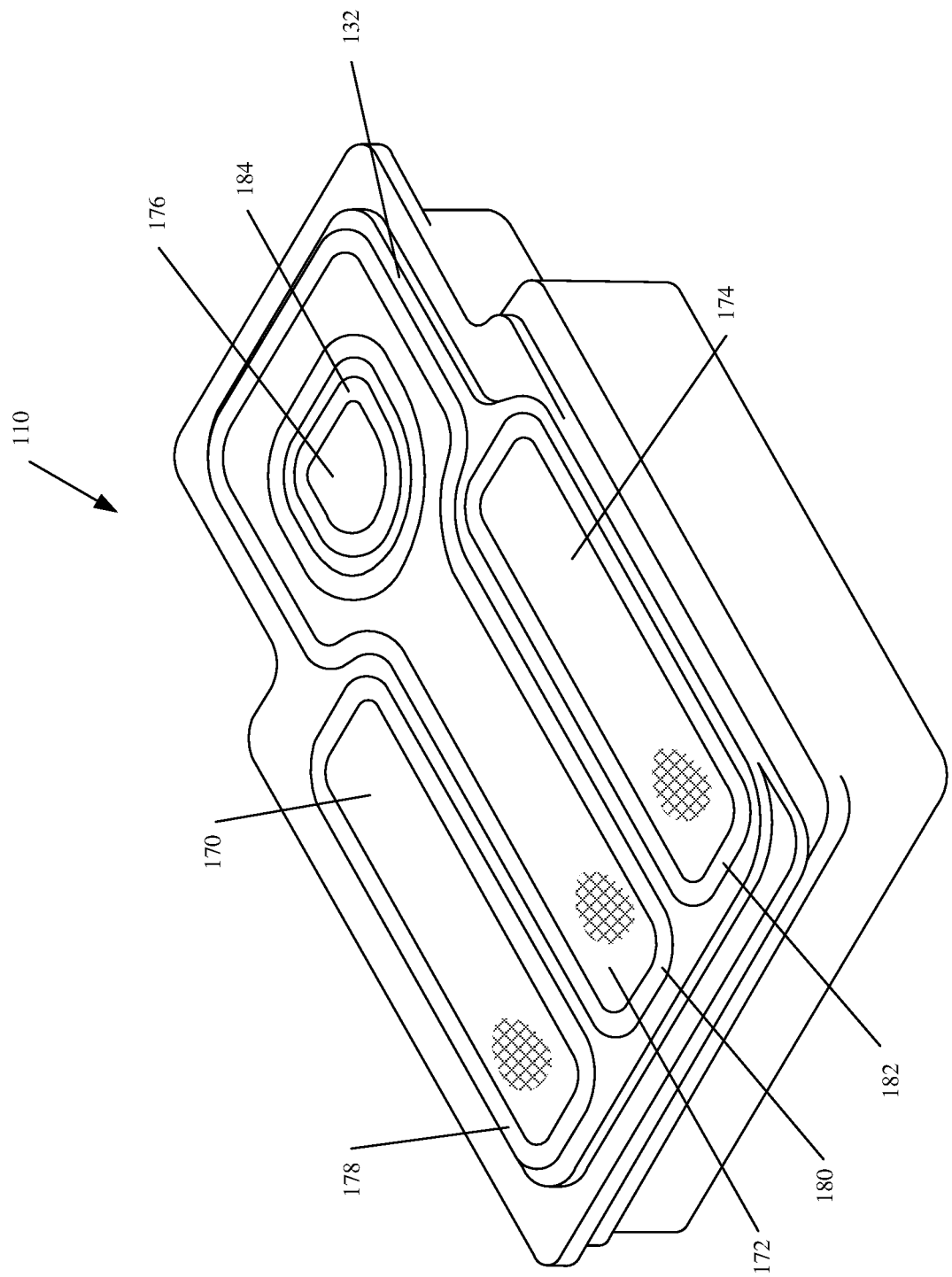
FIG. 4 is a perspective view of a second example of a test weight sensor probe.

FIG. 4 shows another pictorial, perspective view of another example of sensor probe 110. It can be seen that probe 110 shown in FIG. 4 includes four electrodes, 170, 172, 174 and 176. Each of the electrodes has a material facing surface that is seen in FIG. 4. All of the material facing surfaces are co-planar. Each of the electrodes is also surrounded by an insulating material 178, 180, 182 and 184, respectively. Further, the grounded guard 132 is disposed about all of the surfaces of the electrodes except their material facing surfaces (and about the insulators as well). In the example shown in FIG. 4, some of the electrodes can be drive electrodes, while others can be sense electrodes. For instance, electrode 172 can be a drive electrode, while electrodes 170, 174 and 176 are sense electrodes. In another example, electrode 176 is a fill sense electrode. It can be used when sensing grain. The probe is oriented so that it lies in a vertical plane and electrode 176 is higher than the other electrodes. In this orientation, when current above a minimum amount is sensed in electrode 176 the other electrodes are known to be completely covered with material (such as grain) and a valid permittivity measurement can be made. Of course, the drive electrodes and sense electrodes can be different as well. FIG. 4 shows that the particular geometrical configuration of the electrodes can take a wide variety of different forms.

Figure 5:
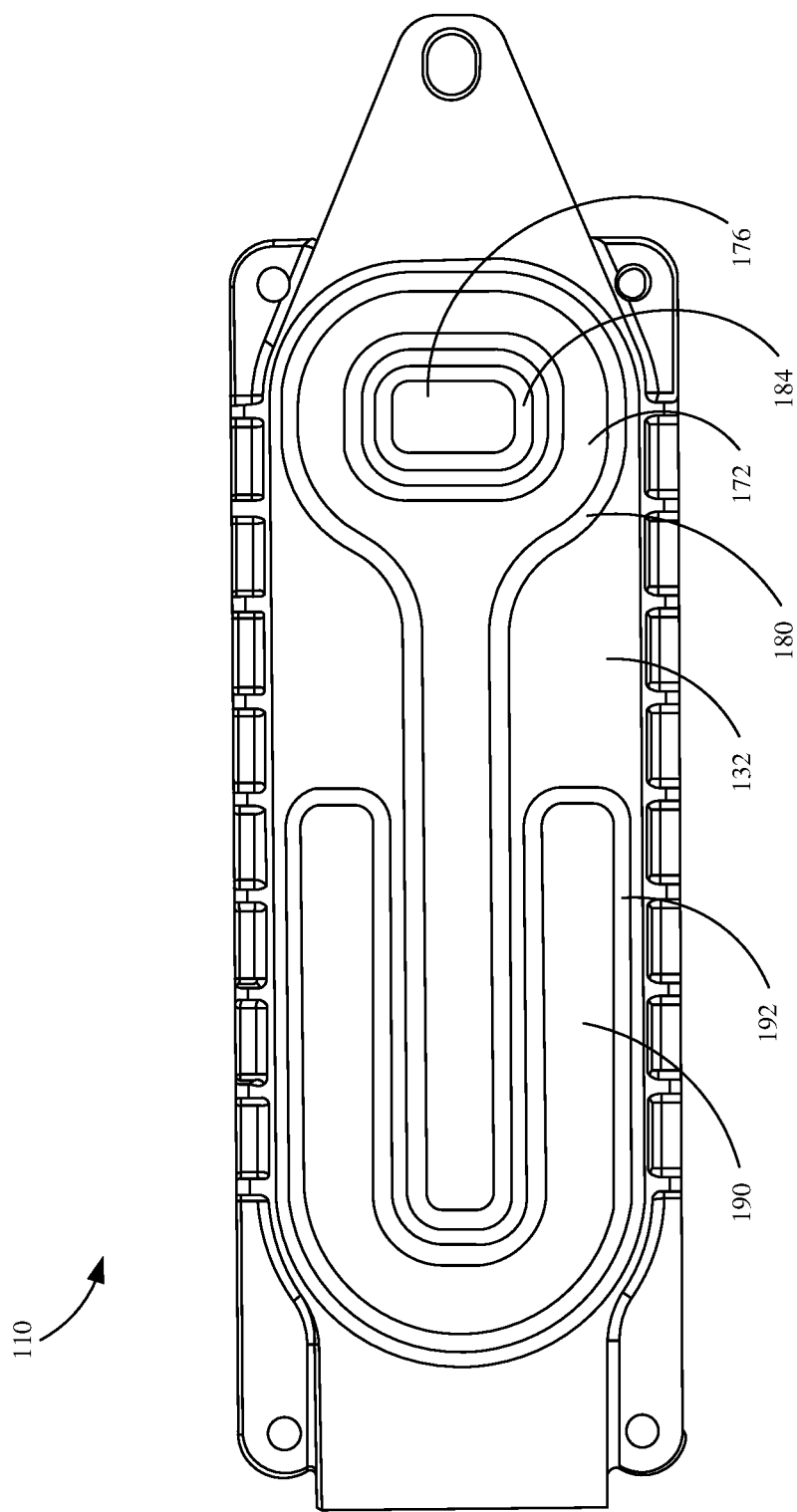
FIG. 5 shows another pictorial, perspective view of another example of a sensor probe.

FIG. 5 shows another example, in which the electrodes have a different geometrical configuration. Some items are similar to those shown in FIG. 4, and they are similarly numbered. It can be seen in FIG. 5, however, that electrodes 170 and 174 have now been joined into a generally "U" shaped electrode 190. Similarly, instead of having separate insulating material 178 and 182 (around the electrodes shown in FIG. 4) a single insulating material 192 is disposed about electrode 190.

Figure 6:
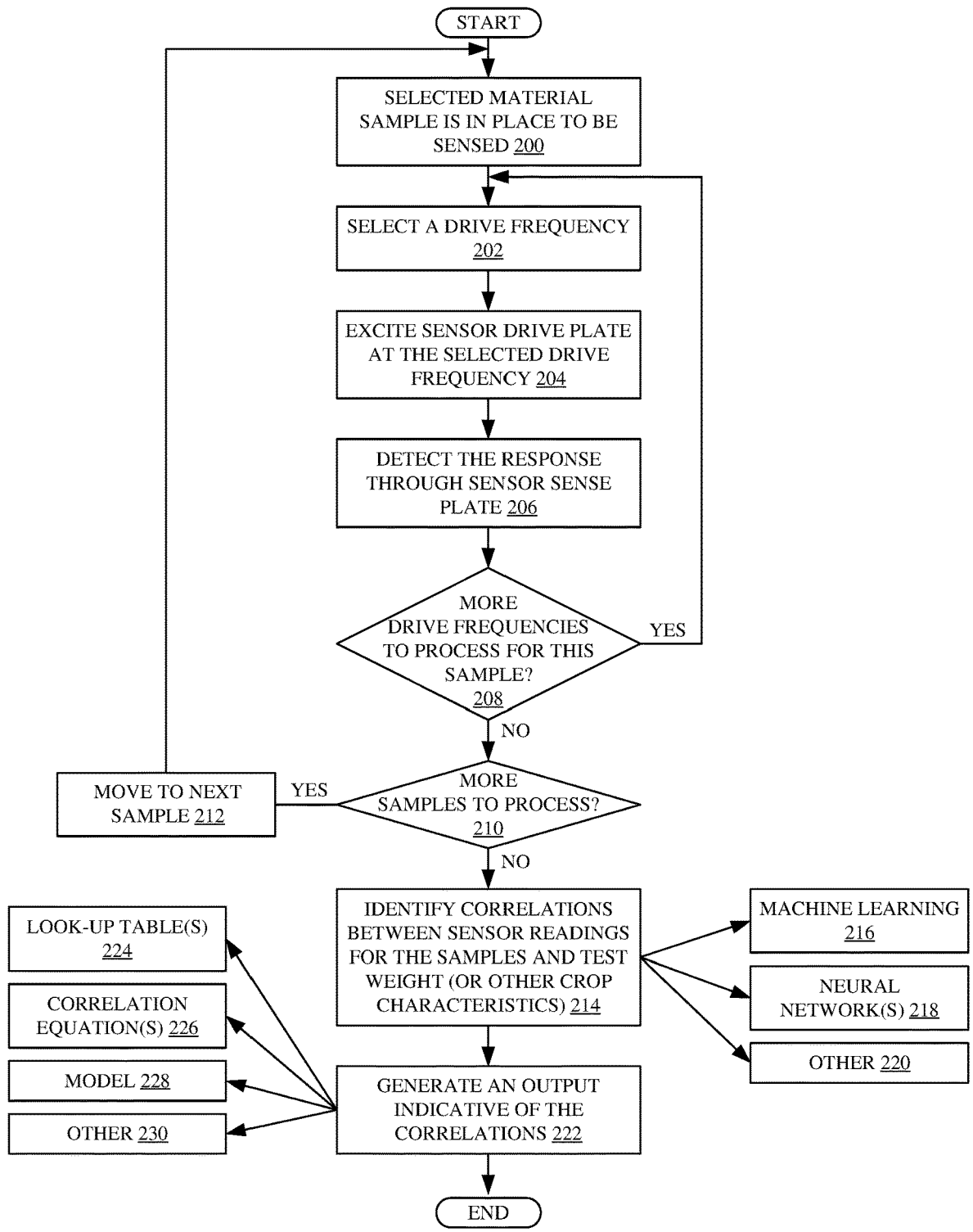
FIG. 6 is a flow diagram showing one example of identifying correlations between measured permittivity and a crop characteristic.

FIG. 6 is a flow diagram illustrating one example of the operation of correlation generation system 101. It generates correlations between different permittivities measured by probe 110, and crop characteristics that are correlated to those measurements. In the example described at FIG. 6, the crop characteristic being correlated to permittivity is test weight. This is just one example.

A selected material sample is assumed to be in place relative to probe 110. This is indicated by block 200 in the flow diagram of FIG. 6. Correlation generation system 101 then selects a first drive frequency at which drive component 108 is to driven. This is indicated by block 202. Drive component 108 then excites the drive electrodes in coplanar test weight sensor probe 110 at the selected drive frequency. This is indicated by block 204.

Sense component 112 then senses the result of applying the excitation voltage. Detecting the response through a sense plate (or sense electrode) on probe 110 is indicated by block 206 in the flow diagram of FIG. 6.

As discussed above, it may be that processor 106 determines that it is to use drive component 108 to excite the drive electrodes in probe 110 at a plurality of different frequencies. This is indicated by block 208. If so, processing returns to block 202 where another excitation frequency is selected.

Once the sample has been excited at the desired number of frequencies, and the responses to those excitations has been sensed, then processor 106 determines whether more samples are to be sensed. This is indicated by block 210. If so, a next sample is obtained, and that sample is moved in place relative to sensor probe 110. This is indicated by blocks 212 and 200 in FIG. 6. Also, for each example, the actual value of the characteristic under analysis is also measured. For example, either before or after the sensor readings have been taken for a sample, its actual test weight is measured. This can be done manually or otherwise.

Once a sufficient number of samples have been processed, then correlation generation system 101 identifies correlations between the sensor readings for the samples and test weight (or other crop characteristics for which correlations are being identified). This is indicated by block 214. For instance, by taking a sufficient number of readings using sensor probe 110, and by measuring the actual test weight of those samples, correlations between the measurements taken by probe 110 and the actual test weight can be identified using machine learning 216, using a neural network learning system 218, or using a wide variety of other mechanisms for learning correlations between different sets of data, as indicated by block 220.

Correlation generation system 101 then outputs the correlations 105. This is indicated by block 222 in the flow diagram of FIG. 6. This can be done in a number of different ways as well. For instance, system 101 can output correlations 105 as a set of values in a look up table. The look up table can be indexed by crop type, by permittivity value, among a wide variety of other things. Thus, during runtime, when probe 110 generates a permittivity value for a crop sample being processed (e.g., during a harvesting operation), then processor 106 can run logic 107 to access the correlations 105 in the look up table to identify a test weight value corresponding to that measurement. This is described in greater detail below with respect to FIG. 7. Storing the correlations 105 as values in look up tables is indicated by block 224 in the flow diagram of FIG. 6.

In another example, correlation generation system 101 can output correlations 105 as one or more correlation equations 226. Variables in the equations can corresponds to crop type, the permittivity readings generated during runtime, among other things. The correlation equations 226 can then be accessed and used to calculate a test weight value when values are input for the variables.

The correlations 105 can be output and represented by a model 228. There may be different models generated for different types of crops or under different circumstances or based on other criteria. The model illustratively takes, as an input, the permittivity value sensed by probe 110, and outputs a test weight value corresponding to that permittivity input.

The correlations 105 can be output in a wide variety of other ways 230 as well. They can be stored in data store 103 where they can be accessed by processor 106 and logic 107, during runtime, or they can be directly input to processor 106 and operated on by logic 107, or output in other ways.

Figure 7A:
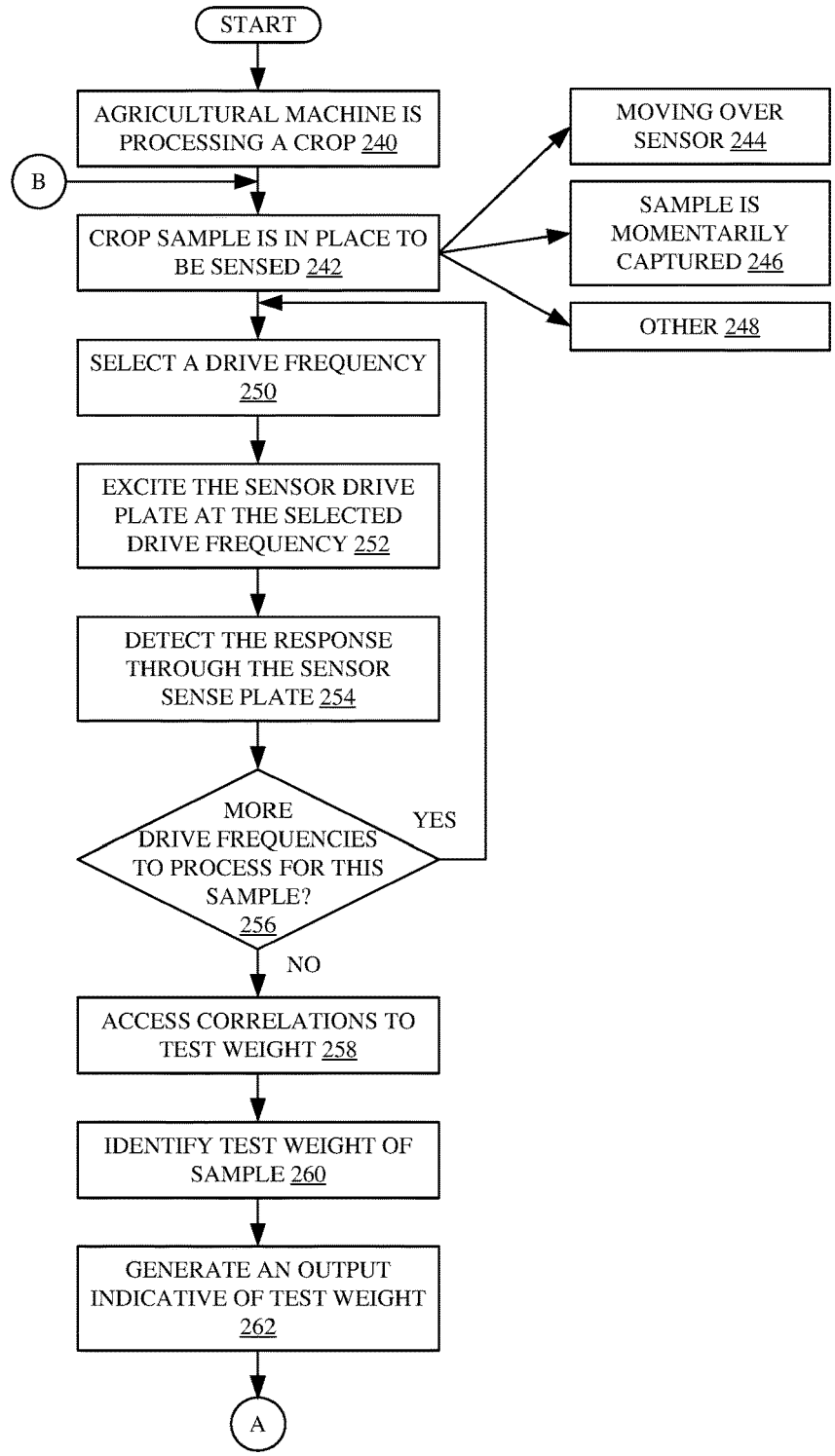
FIGS. 7A and 7B (collectively referred to herein as FIG. 7) show a flow diagram illustrating one example of the operation of the agricultural machine shown in FIG. 1 in identifying a test weight of sampled crop material and generating an action signal based on the test weight.
Figure 7B:
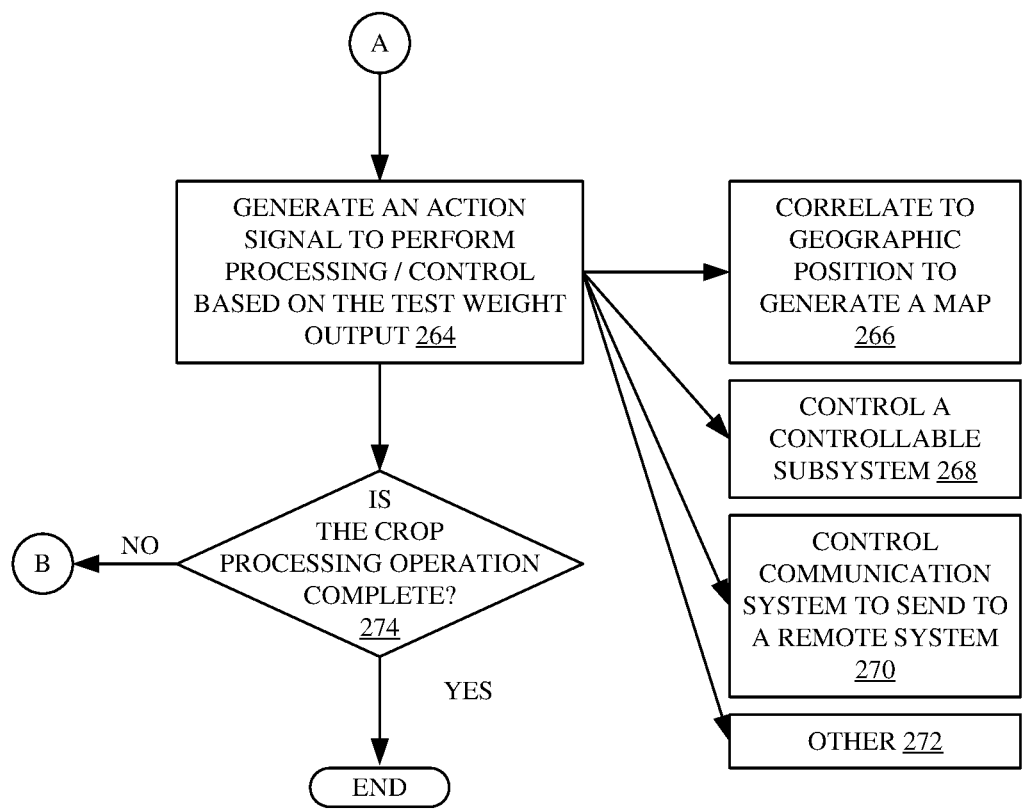

FIGS. 7A and 7B (collectively referred to herein as FIG. 7) illustrate a flow diagram showing one example of the operation of processor 106 running logic 107 in determining a test weight for crop samples being processed by machine 102, and generating an action signal based upon the identified test weight. It will be appreciated that test weight is only one example of a crop characteristic that can be identified and output using probe 110. Others, such as crop density, crop moisture, among other things, can also be determined. In those scenarios, the correlations 105 are correlations between the measured permittivity values and values for the selected crop characteristic. Once the correlations are known, however, the process described with respect to FIG. 7 can be performed for other crop characteristics as well. Performing the operations for test weight is described for the sake of example.

It is first assumed that agricultural machine 102 is processing a crop. This is indicated by block 240 in the flow diagram of FIG. 7. At some point, a crop sample will be in place to be sensed by probe 110. This is indicated by block 242. The crop sample can be moving over the plates in sensor probe 110, as indicated by block 244. In another example, a crop sample can be momentarily captured from the flow of crop through machine 102 so that one or more different measurements can be taken using probe 110, and then released back into the flow of crop through machine 102. This is indicated by block 246. The crop sample can be put in place to be sensed in a wide variety of other ways as well, and this is indicated by block 248.

Logic 107 can configure processor 106 to perform a number of operations. Using logic 107, processor 106 selects a drive frequency (or excitation frequency) as indicated by block 250. It uses drive component 108 to excite the sensor drive electrodes in probe 110 at the selected drive frequency. This is indicated by block 252. Sense component 112 then senses a response to the excitation at the sense electrodes in sensor probe 110. This is indicated by block 254. Processor 106 can identify a permittivity based upon the sensed response and the excitation signal applied. This process can be repeated at multiple different excitation frequencies, as indicated by block 256.

Once the process has been repeated at a desired number of different frequencies, processor 106 accesses the correlations 105, which may be stored in data store 103. Accessing the correlations between the measured values and test weight values is indicated by block 258 in FIG. 7.

Based on the correlations, processor 106 identifies a test weight value for the sample that was just sensed. This is indicated by block 260. Processor 106 can generate an output 116 indicative of the calculated test weight. This is indicated by block 262.

Processor 106 and/or control system 284 then generate an action signal to perform processing and/or control, based upon the calculated test weight output 116. This is indicated by block 264 in the flow diagram of FIG. 7. The action signal can be used to perform a wide variety of different tasks based upon the measured test weight.

In one example, it is provided to a mapping system and is correlated to a geographic position in order to generate a test weight map that maps test weight values against geographic locations in the field being harvested. This is indicted by block 266. This can be used to make changes during subsequent operations or during future planting and harvesting operations in the field being harvested.

In another example, the action signal is an output to control system 284 which controls one or more of the controllable subsystems 286 based upon the test weight. This is indicated by block 268. For example, it can control machine settings based on the test weight, it can control machine speed or machine direction based on the test weight, or it can control any of a wide variety of other controllable subsystems on machine 102, based upon the test weight output 116.

In another example, the calculated test weight output 116 can be provided to communication system 280. Communication system 280 can send the test weight value to a remote system (such as a farm manager system, or another remote system) where it can be further processed at that system. Controlling a communication system to send the test weight to a remote system is indicated by block 270 in the flow diagram of FIG. 7.

The action signal can be output in a wide variety of other ways as well. It can be used to perform a wide variety of other actions. This is indicated by block 272.

This type of test weight determination and action signal generation can continue until the crop processing operation (e.g., the harvesting operation) is complete. This is indicated by block 274.

It can thus be seen that by providing co-planar electrode surfaces on sensor probe 110, the complex drive voltage and resulting complex current can be measured and used to compute the permittivity of the sensed material 104. This, in turn, can be used to generate a measure of the test weight, moisture, density, etc. of material 104. The grounded guard electrode 132 that forms part of the probe structure is positioned relative to the sense electrodes so as to shield the sense electrodes from substantially all electric field flux that does not pass substantially only through the space where the sensed material 104 resides. Flux that is generated by the drive electrode and that passes through the insulator material or other things links with the grounded guard and is not sensed. With this configuration, the probe measures only the permittivity of the sensed material 104 and is relatively insensitive to characteristics of the probe structure (such as the insulators surrounding the electrodes). Further, by sensing currents in the sense electrode rather than in the drive electrode, parasitic capacitive and conductive coupling between the drive electrode and ground is substantially eliminated from the sensed current. Because the sense electrode is maintained at ground potential, sensitivity to parasitic capacitance and conductance between the sense electrode and the surrounding grounded structure is substantially eliminated as well.

Figure 8:
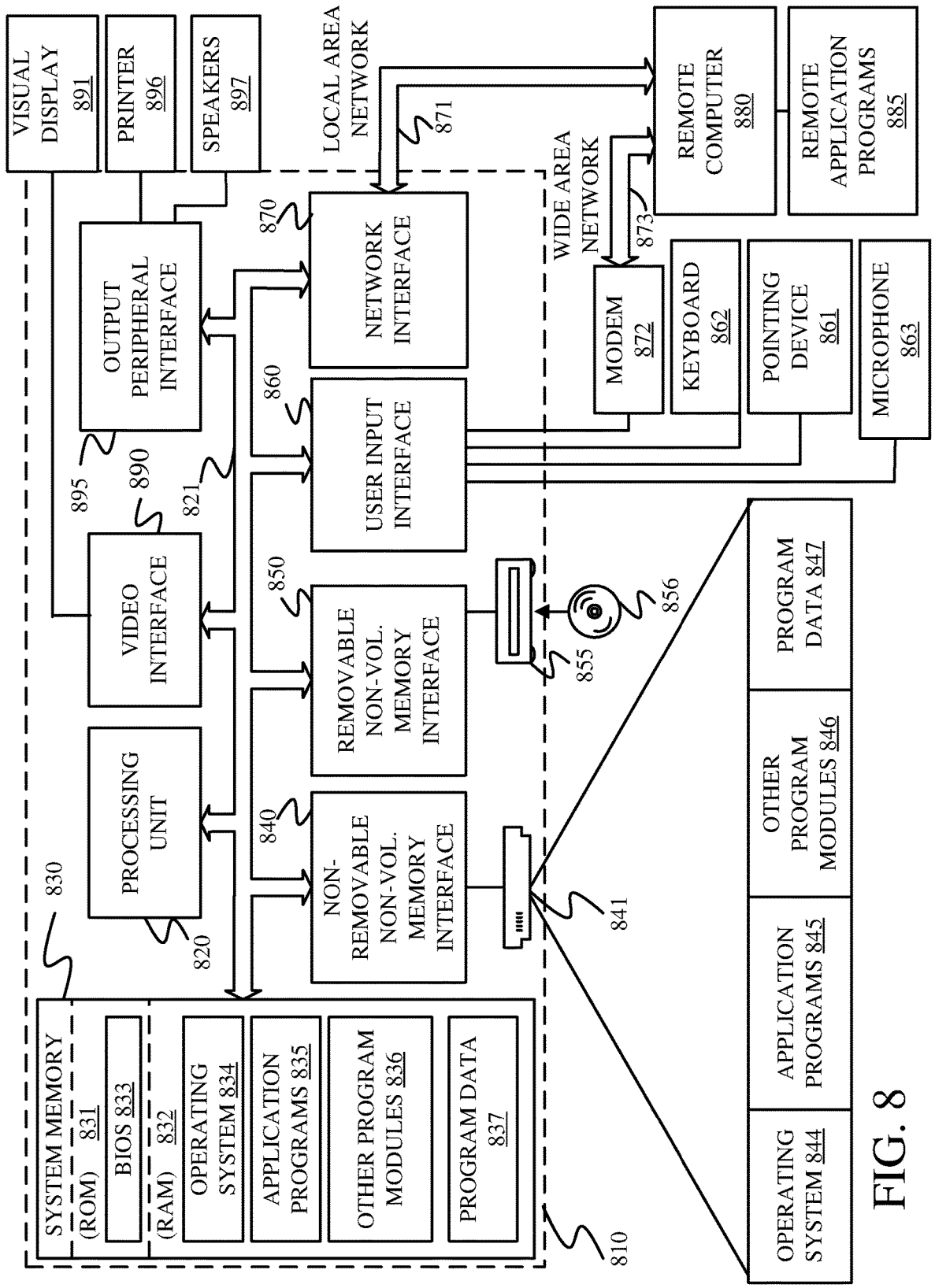
FIG. 8 is a block diagram showing one example of a computing environment that can be used in the agricultural machine.

FIG. 8 is one example of a computing environment in which elements of FIG. 1, or parts of it, (for example) can be deployed. With reference to FIG. 8, an example system for implementing some embodiments includes a computing device in the form of a computer 810. Components of computer 810 may include, but are not limited to, a processing unit 820 (which can comprise processors from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, nonvolatile magnetic disk 852, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 8 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a test weight sensor system, comprising:
a drive component that generates a drive signal;
a drive electrode coupled to the drive component and having a sensed material-facing surface, the drive electrode, when driven by the drive signal, generating an electric field;
a sense electrode having a sensed material-facing surface, the drive electrode and the sense electrode being structurally coupled to one another so the sensed material-facing surfaces of the drive electrode and the sense electrode are generally co-planar;
a sensing component coupled to the sense electrode and generating a sensing signal indicative of a current produced in the sense electrode by the electric field, generated by the drive electrode, reaching the sense electrode; and
a processor that identifies a test weight value corresponding to the sensed material proximate the sensed material-facing surface of the drive electrode and the sense electrode, based on the sensing signal.

Example 2 is the test weight sensor system of any or all previous examples and further comprising:
a set of correlating indicators indicating correlations between values of the sensing signal and test weight values.

Example 3 is the test weight sensor system of any or all previous examples wherein the processor is configured to access a correlation indicator to identify the test weight value based on the value of the sensing signal.

Example 4 is the test weight sensor system of any or all previous examples wherein the processor is configured to receive a position signal from a position sensor and generate an action signal to generate a test weight map of test weight values at different geographic locations based on the test weight value and the position signal.

Example 5 is the test weight sensor system of any or all previous examples and further comprising:
a guard electrode disposed about the sense electrode to inhibit the electric field from reaching the sense electrode other than through the sensed material-facing surface.

Example 6 is the test weight sensor system of any or all previous examples wherein the guard electrode and the sense electrode are held at a reference voltage potential.

Example 7 is the test weight sensor system of any or all previous examples wherein the guard electrode is disposed to form a guard about the sense electrode, and to define an opening to expose the sensed material-facing surface.

Example 8 is the test weight sensor system of any or all previous examples wherein the guard electrode is disposed about substantially all surfaces of the sense electrode other than the sensed material-facing surface.

Example 9 is the test weight sensor system of any or all previous examples and further comprising:

an insulator disposed between the sense electrode and the guard electrode.

Example 10 is the test weight sensor system of any or all previous examples and further comprising:

an insulator disposed between the drive electrode and the guard electrode.

Example 11 is the test weight sensor system of any or all previous examples wherein the sense component comprises:

a current sense amplifier having an input held at the reference voltage potential and receiving, at the input, the current produced in the sense electrode.

Example 12 is the test weight sensor system of any or all previous examples wherein the drive component comprises:

an alternating current (AC) component generating the drive signal as an AC excitation signal.

Example 13 is the test weight sensor system of any or all previous examples wherein the processor measures the AC excitation signal and the sensing signal and determines the test weight of the sensed material proximate the sensed material-facing surfaces of the drive electrode and the sense electrode, based on the AC excitation signal and the sensing signal.

Example 14 is an agricultural machine that transports agricultural material, comprising:

a material conveying mechanism defining a material area through which the agricultural material passes;

a sensor probe including a drive electrode having a material facing surface facing the material area of the material conveying mechanism and a sense electrode having a material facing surface that is co-planar with the material facing surface of the drive electrode, the drive electrode receiving a drive signal and generating an electric field that produces a current in the sense electrode, the sensor probe being mounted relative to the material conveying mechanism to generate a test weight sensor signal, based on the current produced in the sense electrode, indicative of a test weight of the agricultural material passing through the material area of the material conveying mechanism; and a processor that receives the test weight sensor signal and identifies the test weight corresponding to the agricultural material based on the test weight sensor signal.

Example 15 is the agricultural machine of any or all previous examples and further comprising:

a set of correlations correlating test weight values to values indicative of current that flows in the sense electrode.

Example 16 is the agricultural machine of any or all previous examples wherein the processor accesses a correlation in the set of correlations to identify the test weight.

Example 17 is the agricultural machine of any or all previous examples and further comprising:

a controllable subsystem; and a control system that controls the controllable subsystem based on the test weight.

Example 18 is the agricultural machine of any or all previous examples wherein the sensor probe further comprises:

a guard electrode disposed about the sense electrode to inhibit the electrical field from reaching the sense electrode other than through the material area.

Example 19 is the agricultural machine of any or all previous examples wherein the sense electrode and the guard electrode are held at a reference voltage potential.

Example 20 is a test weight sensor system, comprising:

a drive electrode configured to receive an excitation signal and generate an electric field based on the excitation signal, the drive electrode including a sensed material facing electrode surface;

a sense electrode, having a sensed material facing surface that is coplanar with the sensed material facing surface of the drive electrode, and positioned relative to the drive electrode so the electric field produces a current in the sense electrode;

a guard electrode disposed about the sense electrode to substantially eliminate contributions to a flow of the electric field through the sense electrode other than through the sensed material facing surface of the sense electrode; and a processor that receives an indication of the current in the sense electrode and accesses a predetermined correlation that correlates an indication of current in the sense electrode to test weight and identifies a test weight value corresponding to sensed material based on the correlation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A test weight sensor system, comprising:
a drive component that generates a drive signal;
a drive electrode coupled to the drive component and having a sensed material-facing surface, the drive electrode, when driven by the drive signal, generating an electric field;
a sense electrode having a sensed material-facing surface, the drive electrode and the sense electrode being structurally coupled to one another so the sensed material-facing surfaces of the drive electrode and the sense electrode are generally co-planar;
a sensing component coupled to the sense electrode and generating a sensing signal indicative of a current produced in the sense electrode by the electric field, generated by the drive electrode, reaching the sense electrode;
a set of correlating indicators indicating correlations between values of the sensing signal and test weight values; and
a processor that identities a test weight value corresponding to the sensed material proximate the sensed material-facing surface of the drive electrode and the sense electrode, based on the sensing signal.

2. The test weight sensor system of claim 1 wherein the processor is configured to access a correlation indicator to identify the test weight value based on the value of the sensing signal.

3. The test weight sensor system of claim 2 wherein the processor is configured to receive a position signal from a position sensor and generate an action signal to generate a test weight map of test weight values at different geographic locations based on the test weight value and the position signal.

4. The test weight sensor system of claim 1 and further comprising:

a guard electrode disposed about the sense electrode to inhibit the electric field from reaching the sense electrode other than through the sensed material-facing surface.

5. The test weight sensor system of claim 4 wherein the guard electrode and the sense electrode are held at a reference voltage potential.

6. The test weight sensor system of claim 5 wherein the guard electrode is disposed to form a guard about the sense electrode, and to define an opening to expose the sensed material-facing surface.

7. The test weight sensor system of claim 6 wherein the guard electrode is disposed about substantially all surfaces of the sense electrode other than the sensed material-facing surface.

8. The test weight sensor system of claim 6 and further comprising:
an insulator disposed between the sense electrode and the guard electrode.

9. The test weight sensor system of claim 6 and further comprising:
an insulator disposed between the drive electrode and the guard electrode.

10. The test weight sensor system of claim 5 wherein the sensing component comprises:
a current sense amplifier having an input held at the reference voltage potential and receiving, at the input, the current produced in the sense electrode.

11. The test weight sensor system of claim 10 wherein the drive component comprises:
an alternating current (AC) component generating the drive signal as an AC excitation signal.

12. The test weight sensor system of claim 8 wherein the processor measures the AC excitation signal and the sensing signal and determines the test weight of the sensed material proximate the sensed material-facing surfaces of the drive electrode and the sense electrode, based on the AC excitation signal and the sensing signal.

13. The test weight sensor system of claim 1, wherein the correlating indicators represent variables in a machine-learned algorithm.

14. An agricultural machine that transports agricultural material, comprising:
a material conveying mechanism defining a material area through which the agricultural material passes;
a sensor probe including a drive electrode having a material facing surface facing the material area of the material conveying mechanism and a sense electrode having a material facing surface that is co-planar with the material facing surface of the drive electrode, the drive electrode receiving a drive signal and generating an electric field that produces a current in the sense electrode, the sensor probe being mounted relative to the material conveying mechanism to generate a test weight sensor signal, based on the current produced in the sense electrode, indicative of a test weight of the agricultural material passing through the material area of the material conveying mechanism;
a set of correlations correlating test weight values to values indicative of current that flows in the sense electrode; and
a processor that receives the test weight sensor signal and identities the test weight corresponding to the agricultural material based on the test weight sensor signal.

15. The agricultural machine of claim 14 wherein the processor accesses a correlation in the set of correlations to identify the test weight.

16. The agricultural machine of claim 14 and further comprising:
a controllable subsystem; and
a control system that controls the controllable subsystem based on the test weight.

17. The agricultural machine of claim 14 wherein the sensor probe further comprises:
a guard electrode disposed about the sense electrode to inhibit the electrical field from reaching the sense electrode other than through the material area.

18. The agricultural machine of claim 14 wherein the sense electrode and the guard electrode are held at a reference voltage potential.

19. The agricultural machine of claim 14, wherein the correlations are identified using machine learning.

20. A test weight sensor system, comprising:
a drive electrode configured to receive an excitation signal and generate an electric field based on the excitation signal, the drive electrode including a sensed material facing electrode surface;
a sense electrode, having a sensed material facing surface that is coplanar with the sensed material facing surface of the drive electrode, and positioned relative to the drive electrode so the electric field produces a current in the sense electrode;
a guard electrode disposed about the sense electrode to substantially eliminate contributions to a flow of the electric field through the sense electrode other than through the sensed material facing surface of the sense electrode; and
a processor that receives an indication of the current in the sense electrode and accesses a predetermined correlation that correlates an indication of current in the sense electrode to test weight and identifies a test weight value corresponding to sensed material based on the correlation.

* * * * *